United States Patent [19]

Krüger

[11] Patent Number: 5,263,704
[45] Date of Patent: Nov. 23, 1993

[54] DEVICE FOR DETERMINING THE HEIGHT OF A PILE OF SHEETS

[75] Inventor: Michael Krüger, Edingen-Neckarhausen, Fed. Rep. of Germany

[73] Assignee: Heidelberger Druckmaschinen AG, Heidelberg, Fed. Rep. of Germany

[21] Appl. No.: 885,277

[22] Filed: May 18, 1992

Related U.S. Application Data

[63] Continuation-in-part of Ser. No. 555,258, Jul. 19, 1990, Pat. No. 5,125,641.

[30] Foreign Application Priority Data

Jul. 19, 1989 [DE] Fed. Rep. of Germany ....... 3923884

[51] Int. Cl.$^5$ .................................... B65H 31/10
[52] U.S. Cl. .................... 271/217; 271/155; 271/31
[58] Field of Search ............... 271/147, 215, 217

[56] References Cited

U.S. PATENT DOCUMENTS 2,746,753  5/1956  Battey ................................. 271/31
4,728,093  3/1988  Eberle ................................ 271/103

*Primary Examiner*—Richard A. Schacher
*Attorney, Agent, or Firm*—Herbert L. Lerner; Laurence A. Greenberg

[57] ABSTRACT

A device for determining the height of a pile of sheets includes a measuring sensor formed as an expansion member and drivable by compressed air with given contacting force towards a top surface of the sheet pile, and a measuring device for determining the position of the top surface of the sheet pile in accordance with a characteristic curve for time rate of change of pressure of the compressed air.

9 Claims, 5 Drawing Sheets

DEVICE FOR DETERMINING THE HEIGHT OF A PILE OF SHEETS

CROSS-REFERENCE TO RELATED APPLICATION

This application is a continuation-in-part of application Ser. No. 555,258, filed Jul. 19, 1990, and now issued as U.S. Pat. No. 5,125,641 on Jun. 30, 1992.

The invention relates to a device for determining the height of a pile of sheets and, more particularly, to such a device as applied in a sheet feeder or sheet delivery of a printing machine.

Conventional devices of this general type operate with sensors performing mechanical height detection or determination. They are placed with defined pressure into contact with a measuring surface, such as the upper side of a pile of sheets of paper or cardboard, for example. A disadvantage of these heretoforeknown mechanical detection systems is the relatively great expense for the mechanism and the considerable space requirement. Frequently, they also embody a given hazard to the operating personnel and therefore require a suitable protective covering or sheathing which hardly permits them to be used, for example, in the delivery of a printing machine.

Other systems which have contact-free operation, for example, based upon light barriers, optical spacer sensors, ultrasonics or the like have a disadvantage in that, for example, a wavy sheet falsifies a possible measurement result.

It is accordingly an object of the invention to provide a device for determining the height of a pile of sheets which is of relatively simple construction yet can effect the determination in a most advantageous manner.

With the foregoing and other objects in view, there is provided, in accordance with the invention, a device for determining the height of a pile of sheets, comprising a measuring sensor formed as an expansion member and pneumatically drivable towards a top surface of the sheet pile.

In accordance with another feature of the invention, there is provided a means for controlling a compressed air supply for pneumatically driving the measuring sensor in accordance with a measuring position of the measuring sensor.

In accordance with a further feature of the invention, the controlling means for the compressed air supply is actuable for reversing a flow of compressed air from the compressed air supply when the measuring sensor has reached the measuring position thereof.

In accordance with an added feature of the invention, there is provided a measuring means operatively associated with the measuring sensor.

In accordance with an additional feature of the invention, the pneumatically drivable expansion member has an inherent restoring force opposing movement thereof.

In accordance with again another feature of the invention, the expansion member comprises a wound hose unwindable in a direction towards a measuring surface at the top surface of the sheet pile by action of compressed air introduced into the hose, the hose being engageable at an unwound free end thereof with the measuring surface, and including measuring means having an input for receiving a signal corresponding to an increase in compressed air for unwinding the hose so that its free end engages the measuring surface.

In accordance with again a further feature of the invention, the hose is formed with a plurality of air vent holes along the length thereof, the air vent holes being sequentially exposed as the wound hose is unwound.

In accordance with again an added feature of the invention, the expansion member comprises a bellows having an end plate and being expandable by compressed air for moving the end plate in a direction towards a measuring surface at the top surface of the sheet pile.

In accordance with again an additional feature of the invention, the bellows are harmonium-type bellows frustoconically tapering to the end plate.

In accordance with yet another feature of the invention, there is provided a restoring spring disposed in the bellows.

In accordance with a concomitant feature of the invention, the end plate is formed with nozzle openings directed towards the measuring surface.

With the foregoing and other objects in view, there is also provided, in accordance with the invention, in at least one of a sheet feeder and a sheet delivery of a printing machine wherein a sheet pile is disposed on a support surface, a device for determining the height of the sheet pile, comprising a measuring sensor formed as an expansion member, and means for pneumatically driving the measuring sensor towards a top surface of the sheet pile.

In accordance with this construction, a device for determining the height of a sheet pile, for example, at a sheet feeder or sheet delivery of printing machines, is produced which can serve for determining the upper side of a sheet pile and for controlling the height adjustment thereat. The device operates reliably and free of any hazards, though of relatively simple construction. The measurement sensor which is brought into contact with the top surface of the sheet pile smooths out any possible waviness in the sheets; it operates, nevertheless, with a well-definable contact pressure. The increase in compressed air occurring when the expansion member is brought into engagement with the measuring surface at the top of the sheet pile, and the possibly consequent sheet smoothing, can be utilized as a parameter for determining or regulating the contact pressure. When the measuring sensor has reached the proper measuring position thereof and has, for example, completed the measurement, the reversal of the compressed air can occur immediately. Brief compressed-air cycles over very short time periods are involved.

Associated with the expansion member is a measuring system which may be either an optical measuring device, or means for evaluating measurements of the discontinuity point in the rise of the compressed-air after a corresponding approach to and contact with the measuring surface. It is advantageous, for example, if such an auxiliary measuring device is mounted within the measuring sensor, for example, with supply lines to the expansion bellows. A result thereof is that the measuring signal is always reflected from the same material, so that falsification of the intensity due to varying paper colors cannot occur.

The expansion member can be returned repeatedly to its starting position due to its inherent springiness or resilience, i.e. due to a restoring force residing therewithin and/or, for example, by reversing or converting the compressed or forced air to suction air. The latter permits a considerable increase in the measuring frequency. If the compressed air serving for moving the sensor towards the top surface of the sheet pile is simultaneously used as a measuring parameter, the characteristic curve of the rise in the compressed air, and especially the discontinuity present in this characteristic curve, is evaluated in order to determine in the measuring device, the height of the measuring surface, by means of a second parameter, such as the time, for example. The compressed air fed to an expansion member moves the sensor in a direction towards the measuring surface. The characteristic curve of the restoring force which is to be overcome is known and, by calibration or standardization, is introduced into the measuring device. The restoring force is thus dependent upon the restoring spring which may be used. When the sensor makes contact with or becomes seated on the measuring surface, a sudden sharp increase or rise in the characteristic curve of the rising compressed air occurs. The time interval existing between the feeding of the compressed air and this instant of time is then converted by the measuring device into the corresponding height data.

If the sensor is equipped with nozzles, in accordance with the invention, through which the compressed air discharges, superimposed upon the displacement of the sensor, in the direction towards the measuring surface, after a suitable calibration of the device, the pressure increase resulting when a given spaced position between the sensor and the measuring surface has been reached can be forwarded or passed on to the measuring device as a corresponding characteristic curve signal.

The freedom from danger or hazards in the manner of operation of the corresponding device lies especially in that, on the one hand, no large forces are necessary for displacing the sensor in the direction towards the measuring surface and, on the other hand, any obstruction in the travel path of the sensor causes an immediate registration of an increase in compressed air which is transmitted as a parameter, thereby enabling the compressed-air feed to be cut off, with the consequence that the sensor is returned to its initial position due to the restoring force. A possible mere sheet smoothing, as has been found, is readily distinguished from such an obstruction in the characteristic curve of the pressure increase.

The preferred embodiment of the invention, namely a coiled hose as the expansion member and having a roll-tape spring integrated therewith, the coiled hose being preferably a flat hose, permits a relatively simple bridging of relatively great measuring heights.

An advantage is further derived from this construction in that a desirable partial surface which comes into contact with the measuring surface always results from the winding curvature at the end section of the hose. This affords such a finely sensitive contact that damage, including impairment of the printed image of a freshly printed sheet, is avoided, even possibly to the extent of a contact-free measurement. The construction of the expansion member as a bellows, especially as a frustoconically-shaped harmonium or accordion-type bellows, results primarily in a marked spatial stability in the linear displacement of the sensor, even for great bridgeable measuring heights. In general, it is possible to operate the sensor with a defined contact pressure.

Other features which are considered as characteristic for the invention are set forth in the appended claims.

Although the invention is illustrated and described herein as embodied in a device for determining the heights of a pile of sheets, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
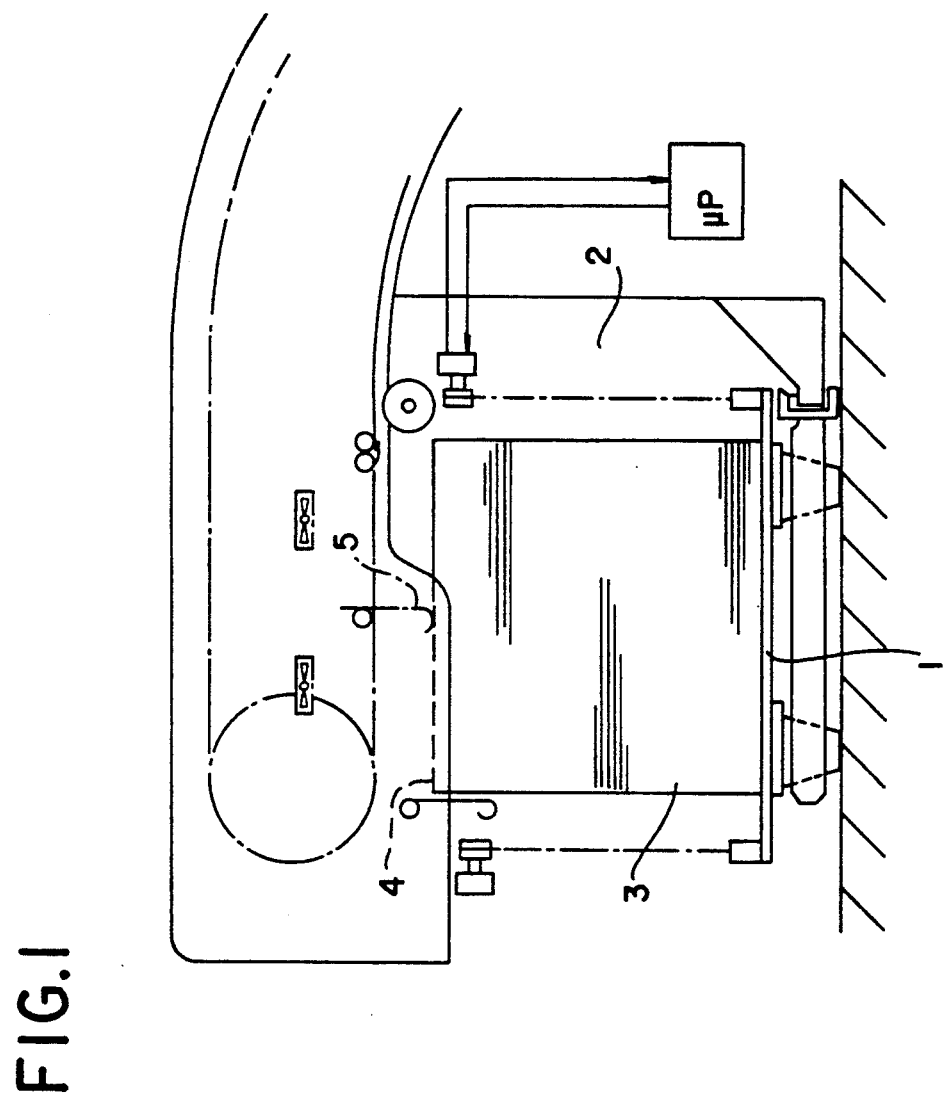
FIG. 1 is a diagrammatic side-elevational view of a sheet delivery of a printing machine equipped with a measuring device according to the invention.

Referring now to the drawing and, first, particularly to FIG. 1 thereof, there is shown therein a pile 3 of sheets, such as of paper or cardboard, for example, disposed on a support surface 1 controllably adjustable in height in a sheet delivery 2. A measuring surface 4 is formed at the upper side of the topmost sheet of the pile 3, and a measuring device 5 for detecting or determining the height of the sheet pile 3 is assigned thereto. The measuring device 5 is fixed in position on a frame of the sheet delivery 2 or, if necessary or desirable, may be adjustable in height in order to avoid excessive differences in the spacing between the fastening location of the measuring device 5 and the measuring surface 4. The measuring device 5 may also be utilized for controlling the adjustment in height of the support surface 1, in order to ensure that the upper edge of the sheet pile 3 will always be located in an optimum operating position.

Figure 4:
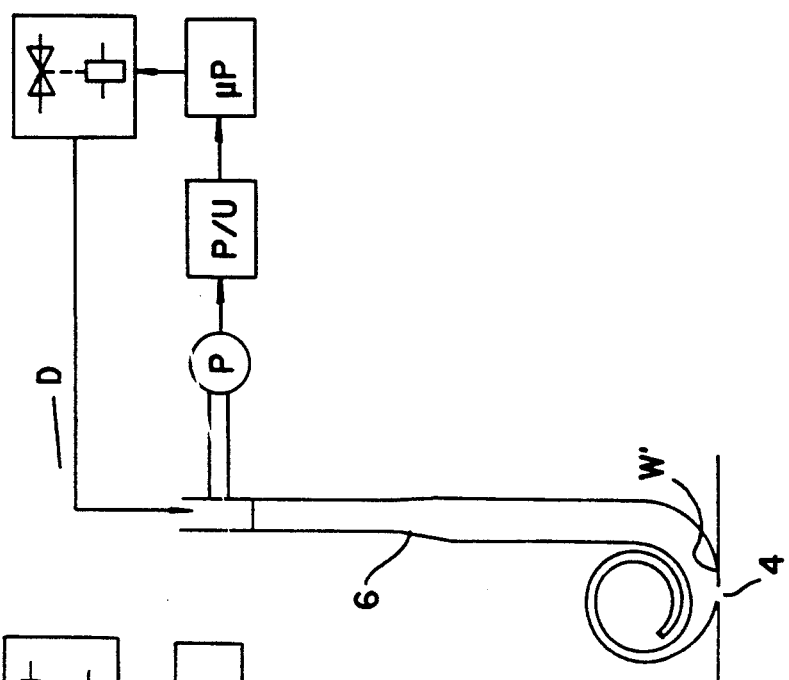
FIGS. 2, 3 and 4 are diagrammatic side-elevational views of an expansion member of the measuring device shown in different operating phases thereof.
Figure 3:
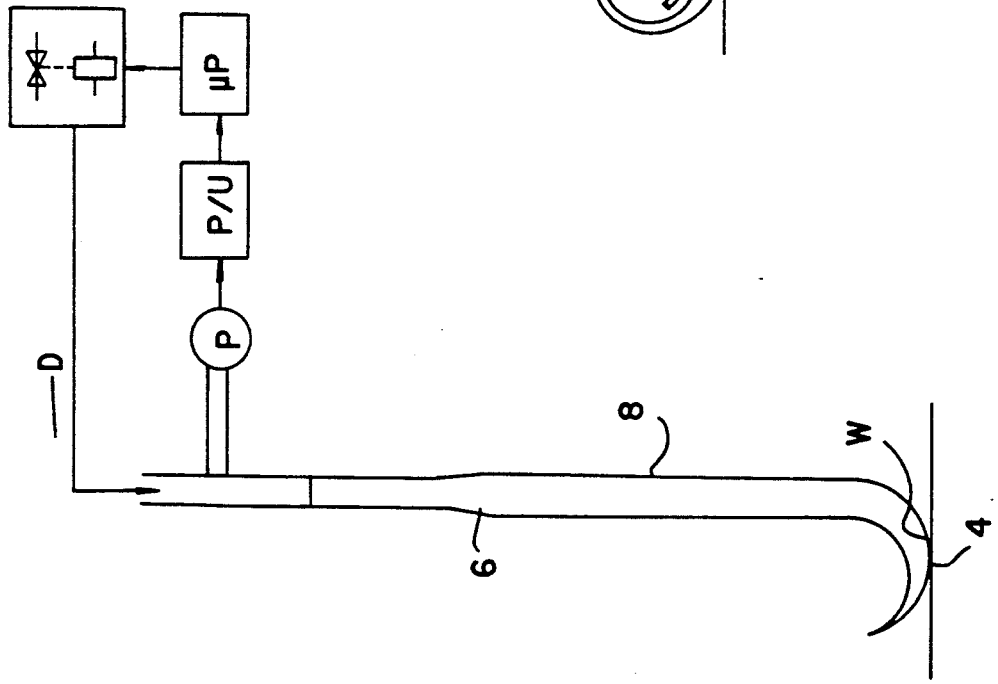
Figure 2:
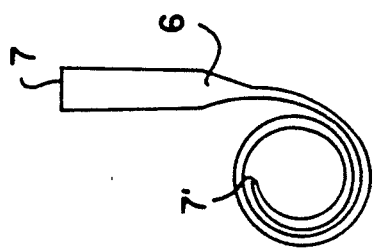

More particularly, the measuring device 5 in the embodiment of FIGS. 2 to 4 includes an expansion member formed of a coiled hose 6 which is unwindable or uncoilable in a direction towards the measuring surface 4. The hose 6 is preferably of flat shape, especially in the coiled or wound condition thereof. The hose 6 has a mouth or inlet opening 7 at one end thereof, and an opposite free end 7' which is closed. A restoring spring 8 (FIG. 3), preferably in the form of a suitable elongated spring-steel strip, is provided in the hose 6. The restoring spring 8 tends always to return the flat hose 6 to its original coiled condition as shown in FIG. 2. When compressed air, as represented by the arrow D, is introduced at a suitable pressure measured by the gauge P into the hose 6, the latter then uncoils or unwinds and thus moves in a direction towards the measuring surface 4. The location at which the hose 6 is fastened in relation to the location of the measuring surface 4 is such that the spacing therebetween is greater than the maximum uncoiled or unwound length of the hose 6. Consequently, the winding arch or curve W at the end of the hose 6 (FIG. 3) always makes contact with the measuring surface 4.

Figure 8:
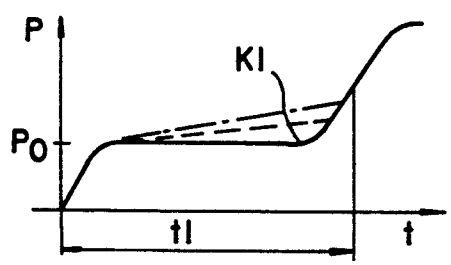
FIGS. 8 and 9 are plot diagrams illustrating the performance of measuring operations with the expansion member according to the invention.

In view of the obstacle formed by the encounter against any further unwinding or uncoiling of the hose 6, an increase in pressure of the supplied compressed air flow occurs. If the measuring surface 4 is located in a higher position, such as is shown, for example, in FIG. 4, the wall region W' of the hose 6 will already have made contact with the measuring surface 4 before the winding curve W of the hose 6 can be extended, and the corresponding increase in the compressed air supplied occurs at an earlier instant of time. The corresponding graphic representation is provided in FIGS. 8 and 9 wherein both plot diagrams illustrate the air pressure as a function of time. FIG. 8 represents the condition up to the complete unwinding or uncoiling of the hose (without any contact thereof with the measuring surface 4), and the elapsed period of time is $t_1$. For the initial phase of free unwinding or uncoiling of the hose 6, it is necessary only for the compressed air D to fill out the volume of the hose 6, and to overcome the resilient restoring force. After the hose 6 has been completely unwound or uncoiled, the characteristic curve makes a sudden sharp rise at the point K1 of the diagram in FIG. 8. Taking a given signal delay time into consideration, the time interval $t_1$ results. The winding arch or curve W at the end of the hose 6 may also make contact with a measuring surface after a shorter time interval ($t_2$ in FIG. 9). It is therefore possible to determine the height of the measuring surface 4 over the time interval $t_2$ which is required for reaching the pressure-increase point K2 by suitable calibration or by reverse calculation utilizing the diagram of FIG. 8.

Figure 9:
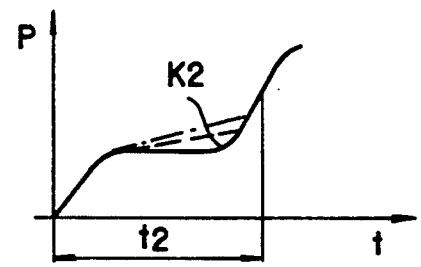

To this end, as shown diagrammatically, for example, in FIGS. 3 and 4, a pressure gauge P is connected to the hose 6 for determining the air pressure therein and is, in turn, connected to a transducer device P/U for converting the measured pressure into a suitable voltage signal. The transducer device P/U is further connected to a microprocessor µP wherein a sharp increase in pressure from $P_0$ to $P+$ occurring over a time interval t, when the winding arch W of the hose 6 makes contact with the measuring surface 4 of the sheet pile 3, is registered in the µP as a result of a corresponding sharp increase in the corresponding voltage signal. For this purpose, characteristic curves, as shown in FIGS. 8 and 9, wherein different time intervals $t_1$ and $t_2$ for the sharp pressure-increase to become effective, are stored in the memory of the microcomputer which then determines, through the use of a suitable program derived from the flow chart of FIG. 14, the distance between the measuring surface 4 of the sheet pile 3 and, as a reference mark, the original location of the measuring device or sensor 5 fixed in position above the sheet pile 3.

As shown in FIG. 1, the microprocessor is also suitably connected to a mechanism for lifting the sheet pile 3, which is responsive to respective voltage signals corresponding to the distance of the measuring surface 4 of the sheet pile 3 from the original fixed position of the measuring device 5, for lifting the sheet pile 3 accordingly.

Figure 14:
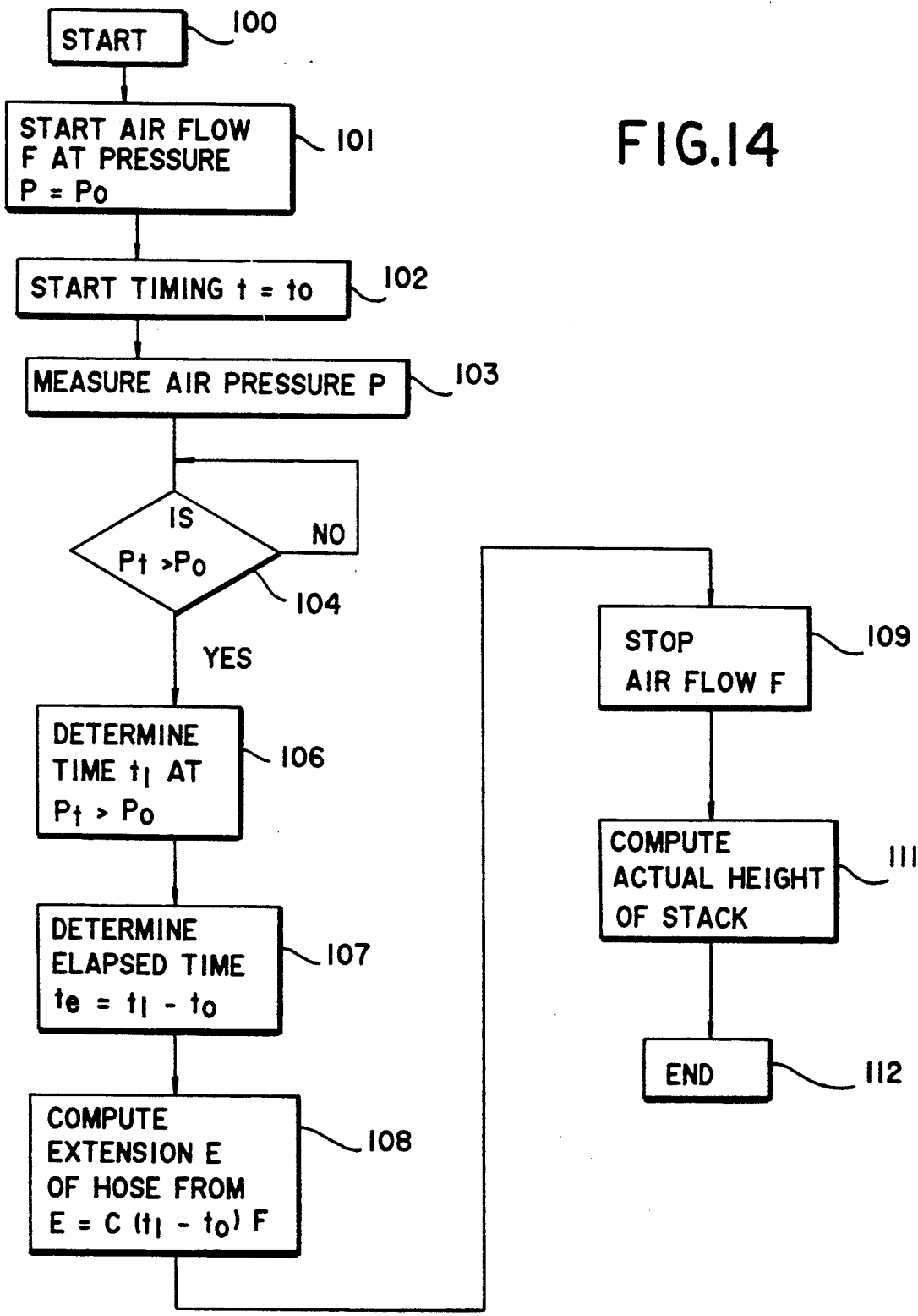
FIG. 14 is a flow chart of the operation of the invention.

The flow chart of FIG. 14 shows the steps of computing the actual height W of the paper stack.

After Start (100), the air flow is turned on at a flow rate equal to F corresponding to an air pressure equal to P0 in step 101. At the same time, a timer is started at time t equal to t0, for example, by means of a microprocessor µP, in step 102. While air is flowing, the air pressure P is measured in step 103 by the pressure gauge P, which, connected to a pressure-to-voltage converter P/U, converts the measured air pressure to an electrical signal in the pressure-to-signal voltage converter P/U, which delivers a voltage signal, e.g. in digital form, to te microprocessor µP. When the hose 6 contacts the surface W, the air pressure quickly rises as shown in FIGS. 8 and 9. The pressure rise is detected in decision step 104, which causes at its YES output a stop in timing at $t=t_1$ in step 106. Next, the elapsed time te is determined as $te=t_1-t_0$ in step 107. Next, the extension E of the hose 6 is determined in step 108 by means of the equation:

$$E = C(t_1 - t_0) F \qquad (1)$$

wherein C is a material constant based on the dimensions of the various structures, $t_1$ is the time of pressure increase from $P=P_0$ to $P=P+$, and F is the air flow applied to the hose 6. At the time $t=t_1$, the air flow is stopped in step 109, and finally the actual height of the paper stack is computed in step 111 by means of the known height of the mounting of the hose 6 and the extension E of the hose as determined by equation (1) in step 108.

A characteristic of the manner of operation of the measuring device according to the invention is its cyclic nature. Control of the measuring device may be effected selectively for venting the hose 6 and returning it to its starting or rest position by either employing only the restoring force of the spring 8 or additionally connect a negative-pressure or vacuum source to the inlet or mouth D for sucking out the air in the hose 6.

Figure 5:
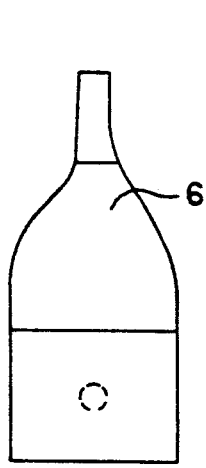
FIG. 5 is a front elevational view of another embodiment of the expansion member.
Figure 6:
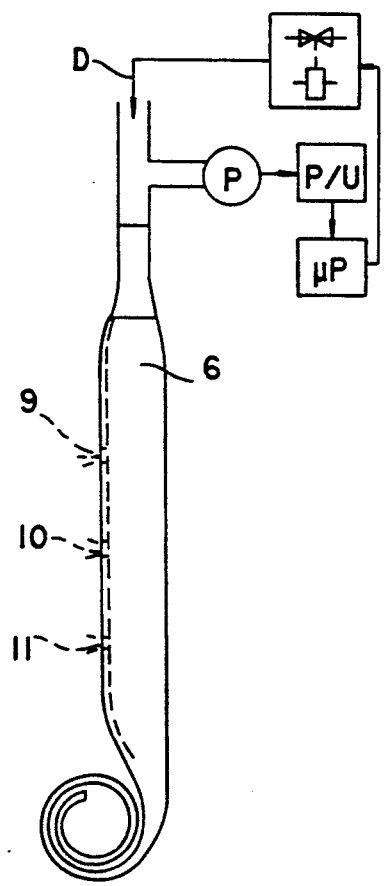
FIGS. 6 and 7 are respective side and front elevational views of the expansion member of FIG. 5 shown in a different operating phase thereof.
Figure 7:
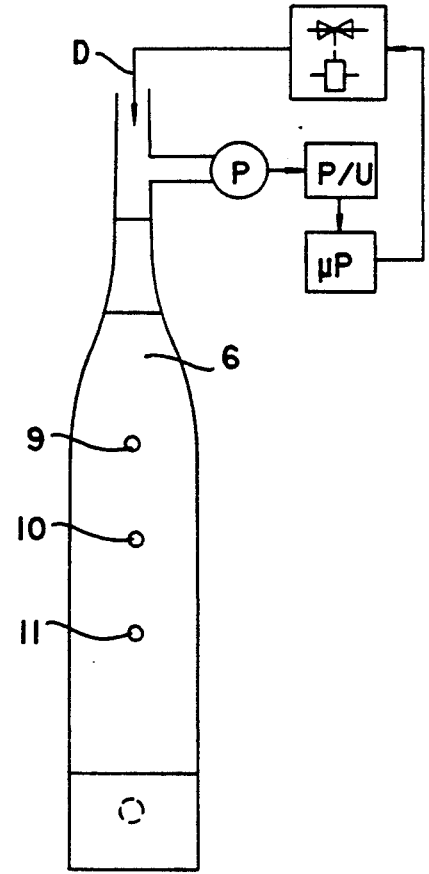

In the slightly modified embodiment of the invention shown in FIGS. 5 to 7, the otherwise identical flat hose 6 is formed with transversely-directed air vent openings 9, 10 and 11 in the casing wall thereof. The openings 9, 10 and 11 are automatically uncovered one-by-one as the hose 6 is unwound or uncoiled, which permits adjustment of the characteristic output curve.

Figure 10:
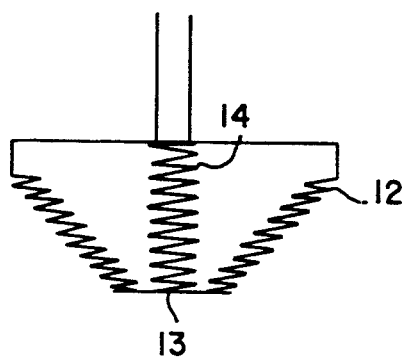
FIGS. 10 and 11 are diagrammatic side elevational views, in different operating phases thereof, of another embodiment of the expansion member of the measuring device, namely constructed as a frustoconical harmonium or accordion-like bellows.
Figure 11:
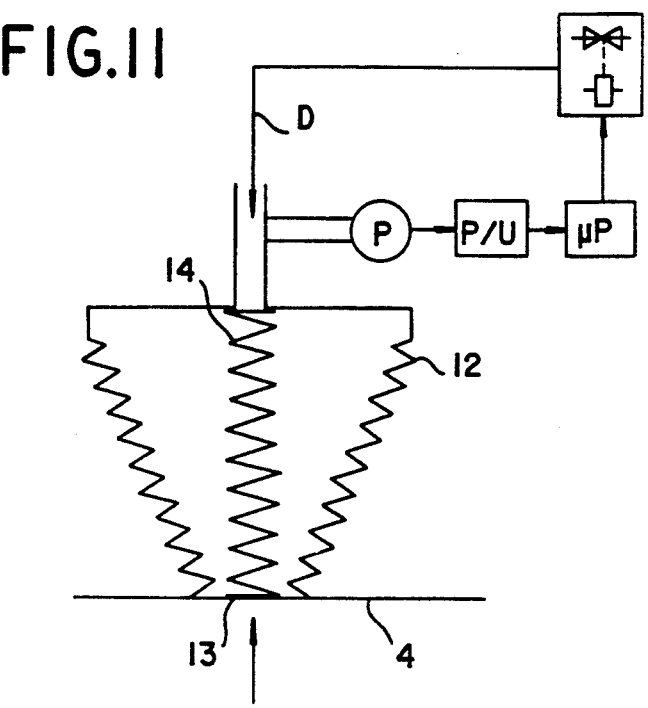

In another embodiment of the inventive device shown in FIGS. 10 and 11, the expansion member is constructed in the form of a frustoconically-shaped harmonium or accordion-type bellows 12 which has an end plate 13 serving as a sensor located at the end surface thereof which is of smaller cross section. The bellows 12 is loaded or prestressed by a restoring tension spring 14 in the phase of operation thereof shown in FIG. 10. When compressed air represented by the arrow D is fed into the bellows 12, as shown in FIG. 11, the sensor end plate 13 is displaced in a direction towards the measuring surface 4. Initially, only the restoring force of the spring 14 (including any possible restoring force inherent in the walls of the bellows 12) has to be overcome. If the sensor end plate 13, however, makes contact with the measuring surface 4, a sudden sharp rise in the characteristic curve appertaining thereto is produced. This rise is passed on as a signal to the measuring device and is evaluated as a measuring parameter, for example, by a comparison thereof with the time required for expanding the bellows 12 from its original position of FIG. 10 to the position thereof shown in FIG. 11.

Figure 12:
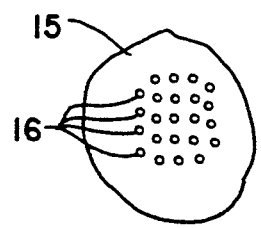
FIGS. 12 and 13 are respective diagrammatic end and side elevational views of another embodiment of the bellows-type expansion member providing a sensor operating free of contact.
Figure 13:
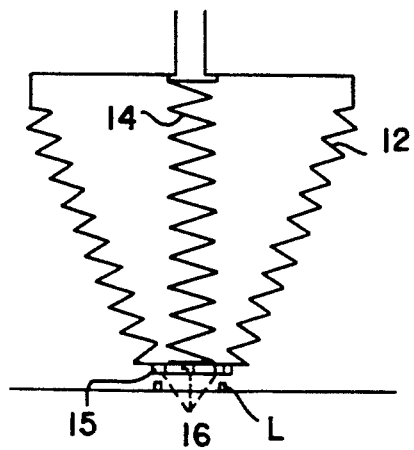

In a further embodiment of the bellows-type expansion member, as shown in FIGS. 12 and 13, a sensor end plate 15 is formed with nozzle openings 16 which are directed towards the measuring surface 4. When the sensor end plate 15 has approached sufficiently close to the measuring surface 4 so that an obstruction of the free compressed-air outlet L of the nozzle opening 16 is formed, a registrable point of sudden rise or increase in the compressed-air characteristic curve occurs, so that, in fact, a measurement of the height at which the measuring surface 4 is located is thereby possible without actually requiring the sensor end plate 15 to make contact with the measuring surface 4.

Further possibilities exist for combining the expansion member-sensing device and the measuring method. Various combinations are conceivable wherein, on the other hand, a defined contact pressure and, on the other hand, a precise measurement may be realized. Measuring methods other than time measuring methods, which may be employed within the scope of the invention are optical measuring methods and ultrasonic or other distance measuring techniques.

I claim:

1. Device for determining the height of a pile of sheets, comprising a measuring sensor formed as an expansion member and drivable by compressed air with given contacting force towards a top surface of the sheet pile, and a measuring device for determining the position of the top surface of the sheet pile in accordance with a characteristic curve for time rate of change of pressure of the compressed air.

2. Device according to claim 1, wherein said measuring device includes means for controlling a supply of the compressed air for driving said measuring sensor in accordance with a measuring position of said measuring sensor at which said measuring sensor is disposed on the top surface of the sheet pile.

3. Device according to claim 2, wherein said controlling means for said compressed air supply is actuable for reversing a flow of compressed air from the compressed air supply when said measuring sensor has reached said measuring position thereof.

4. Device according to claim 1, wherein said expansion member is movable towards the top surface of the sheet pile against an opposing restoring force.

5. Device according to claim 1, wherein said expansion member comprises a bellows having an end plate and being expandable by compressed air for moving said end plate in a direction towards a measuring surface at said top surface of the sheet pile.

6. Device according to claim 5, wherein said bellows are harmonium-type bellows frustoconically tapering to said end plate.

7. Device according to claim 6, including a restoring spring disposed in said bellows.

8. Device according to claim 6, wherein said end plate is formed with nozzle openings directed towards said measuring surface.

9. In at least one of a sheet feeder and a sheet delivery of a printing machine wherein a sheet pile is disposed on a support surface, a device for determining the height of the sheet pile, comprising a measuring sensor formed as an expansion member, means for driving said measuring sensor by compressed air with given contact force towards a top surface of the sheet pile and a measuring device for determining the position of the top surface of the sheet pile in accordance with a characteristic curve for time rate of change of pressure of the compressed air.

* * * * *